(12) United States Patent
Nguyen et al.

(10) Patent No.: US 10,462,073 B2
(45) Date of Patent: Oct. 29, 2019

(54) AIRCRAFT CONTROL DOMAIN COMMUNICATION FRAMEWORK

(71) Applicant: The Boeing Company, Chicago, IL (US)

(72) Inventors: Daniel Nguyen, Auburn, WA (US); Jason W. Shelton, Edgewood, WA (US); Timothy M. Mitchell, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 972 days.

(21) Appl. No.: 14/590,128

(22) Filed: Jan. 6, 2015

(65) Prior Publication Data

US 2016/0197857 A1 Jul. 7, 2016

(51) Int. Cl.
*G06F 21/57* (2013.01)
*H04L 29/08* (2006.01)
*H04L 12/931* (2013.01)

(52) U.S. Cl.
CPC ............ *H04L 49/35* (2013.01); *G06F 21/572* (2013.01); *H04L 67/12* (2013.01)

(58) Field of Classification Search
None
See application file for complete search history.

(56) References Cited

U.S. PATENT DOCUMENTS 4,972,060 A * 11/1990 Edamura .............. H05B 6/6438
219/506
6,128,733 A 10/2000 Miyaguchi et al.
(Continued)

FOREIGN PATENT DOCUMENTS

CN 1262836 A 8/2000
CN 103650383 A 3/2014
(Continued)

OTHER PUBLICATIONS

IpodPatcher reference ("ipodpatcher Wiki", Rockbox website, Jul. 26, 2010 [retrieved on Sep. 17, 2018]. Retrieved from the Internet: <URL: https://www.rockbox.org/wiki/IpodPatcher>. (Year: 2010).*
(Continued)

*Primary Examiner* — Esther B. Henderson
*Assistant Examiner* — Dae Kim
(74) *Attorney, Agent, or Firm* — MH2 Technology Law Group LLP

(57) ABSTRACT

This disclosure relates to updating information in devices of remote systems over a network. A method includes receiving, via a first switch, a first selection. The method also includes activating, based on the first selection, a data partition in a storage device corresponding to the first device. The method further includes deactivating based on the first selection, data partitions in the storage device corresponding to non-selected devices. Additionally, the method includes storing information in the data partition corresponding to the first device. Moreover, the method includes receiving, via a second switch, a second selection. The method also includes determining that the first selection matches the second selection. The method further includes retrieving, based on the determining, the information from said activated data partition. Additionally, the method includes providing the retrieved information to a first device that corresponds to the first selection and the second selection.

19 Claims, 8 Drawing Sheets

(56) References Cited

U.S. PATENT DOCUMENTS

| | | | | |
|---|---|---|---|---|
| 6,615,365 | B1* | 9/2003 | Jenevein | G06F 11/1417 |
| | | | | 711/161 |
| 7,986,974 | B2* | 7/2011 | Arun | H04M 1/271 |
| | | | | 379/406.03 |
| 8,823,852 | B2 | 9/2014 | Yamada et al. | |
| 2002/0111720 | A1 | 8/2002 | Holst et al. | |
| 2003/0003872 | A1* | 1/2003 | Brinkley | G06F 8/61 |
| | | | | 455/66.1 |
| 2003/0200379 | A1* | 10/2003 | Hollingsworth | G06F 3/0607 |
| | | | | 711/103 |
| 2004/0088513 | A1* | 5/2004 | Biessener | G06F 21/85 |
| | | | | 711/173 |
| 2007/0027589 | A1* | 2/2007 | Brinkley | G08G 5/0013 |
| | | | | 701/3 |
| 2007/0115938 | A1 | 5/2007 | Conzachi et al. | |
| 2007/0130437 | A1* | 6/2007 | Larson | G08G 5/00 |
| | | | | 711/165 |
| 2007/0235584 | A1 | 10/2007 | Corman et al. | |
| 2010/0023602 | A1 | 1/2010 | Martone | |
| 2014/0258257 | A1* | 9/2014 | Schowalter | G06F 17/30386 |
| | | | | 707/705 |
| 2015/0126110 | A1* | 5/2015 | Ashley | H04W 8/245 |
| | | | | 455/41.1 |
| 2015/0378936 | A1* | 12/2015 | Danielsson | G06F 12/1458 |
| | | | | 711/163 |
| 2016/0110179 | A1* | 4/2016 | Weckesser | G06F 8/61 |
| | | | | 710/316 |
| 2016/0110368 | A1* | 4/2016 | Mallasch | G06F 17/30569 |
| | | | | 707/690 |
| 2016/0129862 | A1* | 5/2016 | Henrard | H01H 47/04 |
| | | | | 307/9.1 |

FOREIGN PATENT DOCUMENTS

| | | |
|---|---|---|
| JP | 2008-0299376 A | 12/2008 |
| WO | 2013/191606 A1 | 12/2013 |

OTHER PUBLICATIONS

Wikipedia entry ("Two-man rule", Wikipedia website, Oct. 12, 2014 [retrieved on Sep. 17, 2018]. Retrieved from the Internet: <URL: https://web.archive.org/web/20141012124723/https://en.wikipedia.org/wiki/Two-man_rule>. (Year: 2014).*

Sampigethaya et al., "Secure Operation, Control and Maintenance of Future E-enabled Airplanes", Network Security Lab (NSL), EE Department, University of Washington, Seattle, WA 98195, USA, Networked Control Systems Lab, EE Department, University of Washington, Seattle, WA 98195, USA, pp. 1-13.

Extended European Search Report dated Apr. 8, 2016, European Application No. 15199877.0, pp. 1-5.

First Office Action dated Feb. 2, 2019 in corresponding Chinese Application No. 201510968676.4 (English translation and Chinese language provided).

Yoshida, Ayumu (JP Examiner), Notice of Reasons for Rejection dated Jul. 12, 2019, both in English and Japanese.

\* cited by examiner

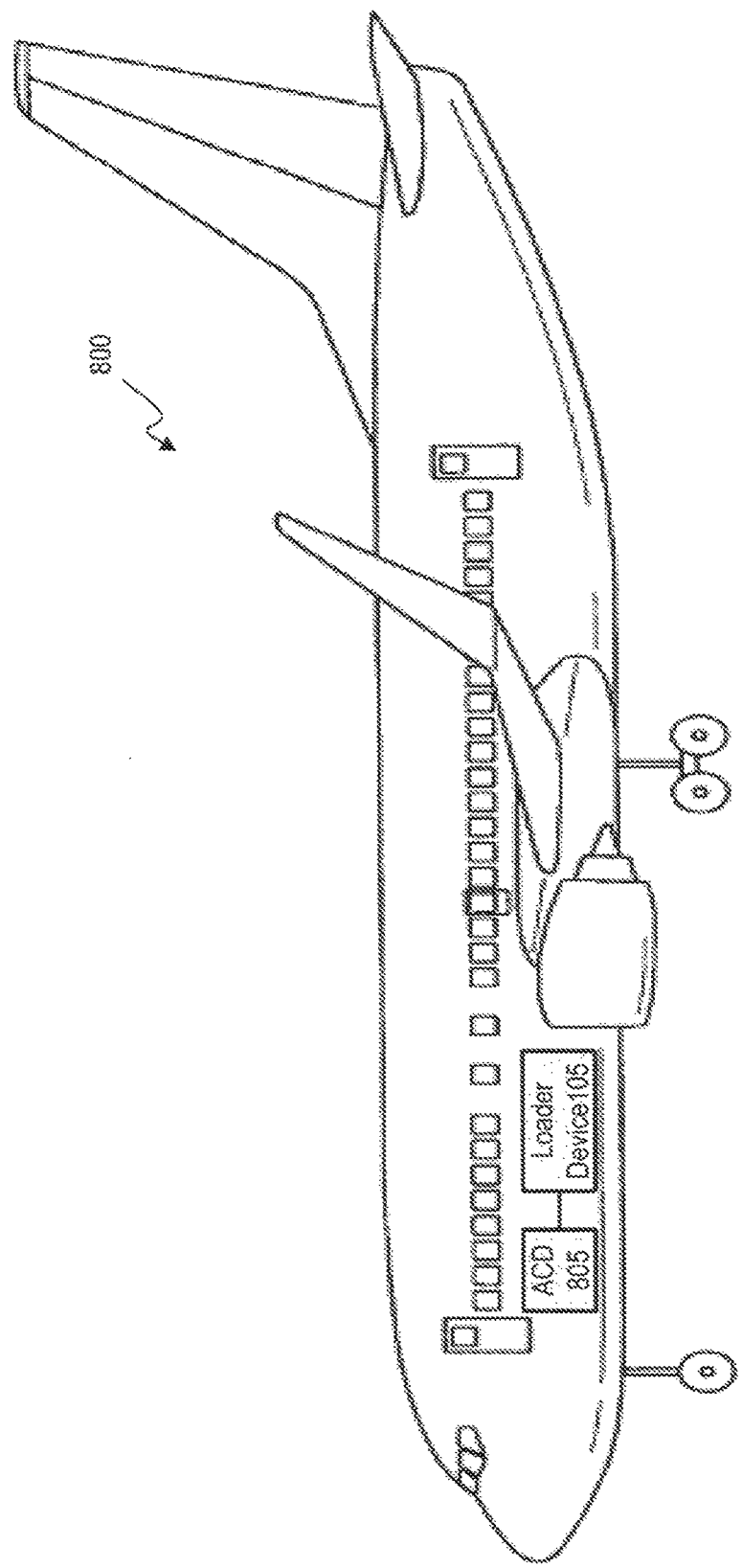

AIRCRAFT CONTROL DOMAIN COMMUNICATION FRAMEWORK

FIELD

This disclosure relates to systems and methods for networking devices of remote systems, and more specifically, to updating information in devices of remote systems over a network.

BACKGROUND

Generally, vehicles include devices that can connect to external networks for various purposes, such as navigation, control, communications, interoperability, and maintenance. For example, an aircraft at a remote terminal of an operator can obtain software for onboard avionics devices from wireless access points. However, this connectivity can make the software more vulnerable to intentional or unintentional corruption.

SUMMARY

The present disclosure provides a method including receiving, via a first switch, a first selection of a first plurality of selections corresponding, respectively, to a plurality of devices. The method also includes activating, based on the first selection, a data partition in a storage device corresponding to a first device that corresponds to the first selection. The method further includes deactivating based on the first selection, data partitions in the storage device corresponding to non-selected devices. Additionally, the method includes, after the activating and the deactivating, storing information in the data partition corresponding to the first device. Moreover, the method includes receiving, via a second switch, a second selection of a second plurality of selections corresponding, respectively, to the devices. The method also includes determining that the first selection matches the second selection. The method further includes retrieving, based on the determining, the information from said activated data partition. Additionally, the method includes providing the retrieved information to the first device that corresponds to the first selection and the second selection.

Further, the present disclosure provides a loader device including a storage device having data partitions corresponding, respectively, to devices. The loader device also includes a program selector including first selections corresponding, respectively, to the devices. The loader device further includes a device selector including selections corresponding, respectively, to the devices. Additionally, the loader device includes logic that provides an information part from a first data partition corresponding to a first of the devices when a first selection received from the program selector matches a second selection received from the device selector.

Still further, the present disclosure provides a system including a processor, a storage system having a logical volume including data partitions, a computer-readable hardware storage device, and program instructions stored on the computer-readable hardware storage device for execution by the processor. The program instructions include program instructions that receive from a first switch a first selection of a first device from a first plurality of selections, wherein the first plurality of selections correspond, respectively, to a plurality of devices. The program instructions also include program instructions that activate a first data partition that corresponds to the first device. The program instructions further include program instructions that deactivate data partitions that correspond to non-selected devices. Additionally, the program instructions include program instructions that store information corresponding to the first device in the first data partition. Further, the program instructions include program instructions that determine whether the first selection matches a second selection received from via a second switch. Moreover, the program instructions include program instructions that retrieve the information from the first data partition based on the determination that the first selection matches the second selection. Furthermore, the program instructions include program instructions that provide the information to the first device.

BRIEF DESCRIPTION OF THE DRAWINGS

The accompanying drawings, which are incorporated in and constitute a part of this specification, illustrate the present teachings and together with the description, serve to explain the principles of the disclosure.

FIG. 8 illustrates an exemplary aircraft including a loader device in accordance with aspects of the disclosure.

It should be noted that some details of the figures have been simplified and are drawn to facilitate understanding of the present teachings, rather than to maintain strict structural accuracy, detail, and scale.

DETAILED DESCRIPTION

This disclosure relates to systems and methods for networking devices of remote systems, and more specifically, to updating information in devices of remote systems over a network. In accordance with aspects of the disclosure, logical and physical security controls are incorporated into a loader device to provide secure communication and routing between an information source at a first endpoint of a distributed information network and devices of a remote system at a second endpoint of the distributed information network. In an exemplary implementation, the information source can be a ground service center (e.g., a maintenance center) of an aircraft operator, and the devices can be avionics of an aircraft at a remote airport. In accordance with the disclosure, the loader device can transfer software from the ground center to the avionics in a robust and secure manner. Implementations of the disclosed loader device provide a security framework for the three stages of information during such transfers: data in rest, data in use, and data in motion. The confidentiality, integrity, and availability of the transfers controlled by the loader device reduces the risk of a remote system obtaining, receiving, and using illegitimate code, malware, corrupted information, etc.

Figure 1:
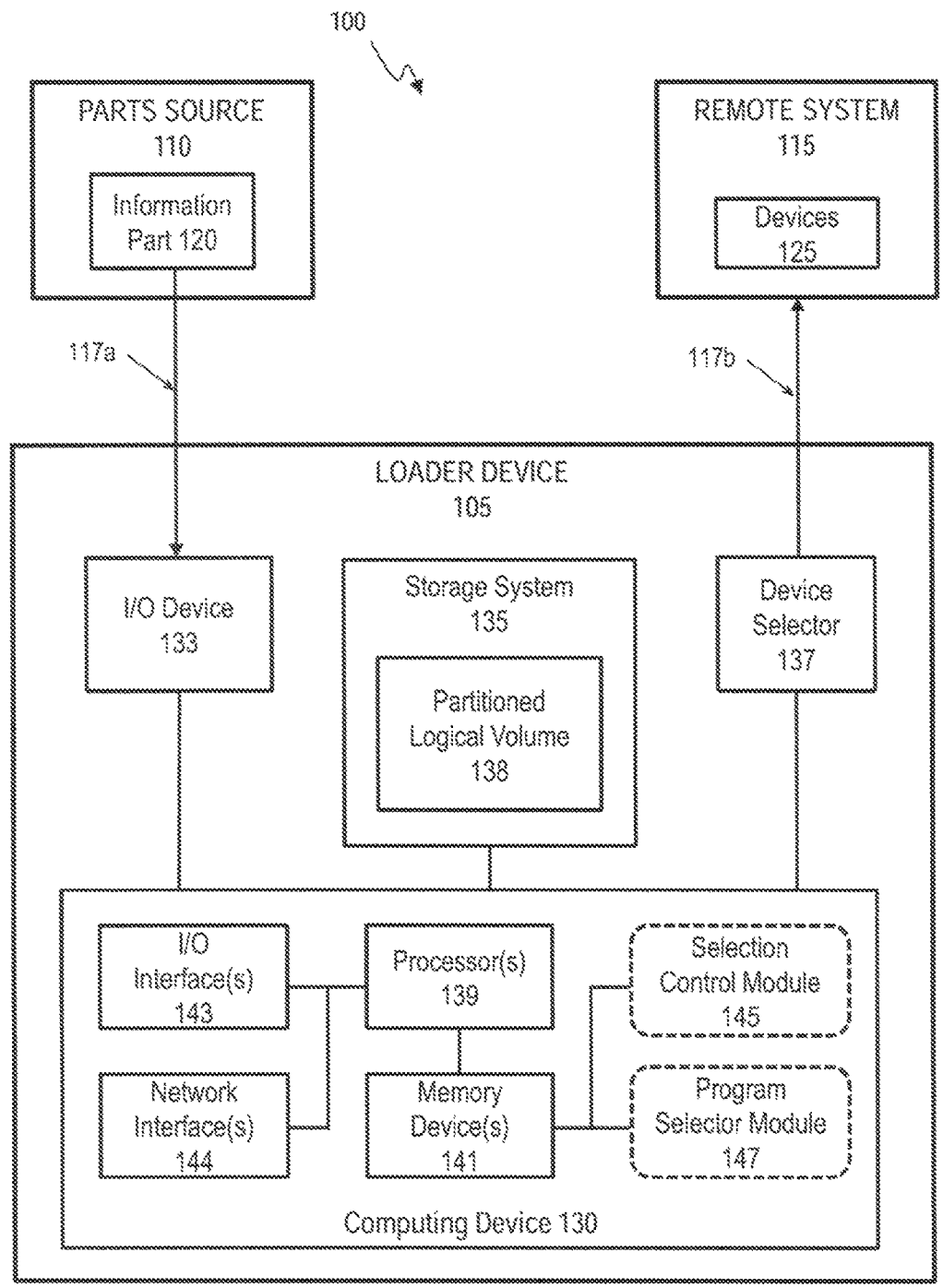
FIG. 1 illustrates a block diagram of an exemplary environment for implementing systems and processes in accordance with aspects of the disclosure.

FIG. 1 is an exemplary environment 100 for implementing methods and systems in accordance with aspects of the disclosure. The environment 100 includes a loader device 105, a parts source 110, and a remote system 115 linked via communication links 117a and 117b. In accordance with aspects of the disclosure, the loader device 105 is a system that provides a user-interface for selectively obtaining an information part 120 from the parts source 110 and for selectively loading the information part 120 into the remote system 115.

The remote system 115 can be any type of system comprised of devices 125 having software and/or data that can be reconfigured and/or replaced. In embodiments, the remote system 115 can be a vehicle, such as an aircraft and the devices can be modular devices (e.g., line-replaceable units) of, for example, an aircraft control domain (e.g., line-replaceable units), such as a flight control computer ("FCC"), a flight management computer ("FMC"), an engine interface unit ("EIU"), an engine monitoring unit ("EMU"), an inertial reference unit ("IRU"), a ground proximity warning system ("GPWS"), etc. However, it is understood that embodiments of the disclosure are not limited to vehicles, and can include other types of mobile and non-mobile systems. Further, while FIG. 1 shows the loader device 105 as being separate from the remote system 115, embodiments of the disclosure are not limited to this relationship. Rather, the loader device 105 can be, for example, a mobile system that is operated within the remote system 115, or integrated in the remote system 115. Thus, advantageously, implementations of the disclosure can eliminate the need for loading the devices 125 using, e.g., a maintenance laptop.

In accordance with aspects of the disclosure, the parts source 110 is a system that maintains information parts, including information part 120, for the devices 125 of the remote system 115. The information part 120 is one or more replaceable units (e.g., packages) of software and/or data corresponding to a particular one of the devices 125 or to particular types of the devices 125. As noted previously, in implementations the parts source 110 can be a remote ground service for aircraft, such as a maintenance center of an aircraft operator. The maintenance center can maintain different software packages (e.g., software updates) for different avionics devices of the aircraft. For example, the information part 120 can correspond to one or more FMCs of the aircraft, and a second information part (not shown) can correspond to one or more FCCs of the aircraft.

The communications links 117a, 117b can comprise any combination of wired and/or wireless links; any combination of one or more types of networks (e.g., the Internet, a wide area network, a local area network, a virtual private network, etc.); and/or utilize any combination of transmission techniques and protocols. In accordance with aspects of the disclosure, one or both of communication links 117a, 117b can be secure links. In embodiments, the communication link 117a can be a secure internet protocol link through which a virtual private network tunnel can be established between the part source 110 and the loader device 105.

In accordance with aspects of the disclosure, the loader device 105 includes hardware and software that perform the processes and functions described herein. In particular, the loader device 105 includes a computing device 130, an input/output (I/O) device 133, a storage system 135, and a device selector 137. The I/O device 133 can include any device that enables an individual to interact with the computing device 130 (e.g., a user interface) and/or any device that enables the computing device 130 to communicate with one or more other computing devices using any type of communications link. The I/O device 133 can be for example, a handheld device, PDA, touchscreen display, handset, keyboard, etc.

The storage system 135 can comprise a computer-readable, non-volatile hardware storage device that stores information and program instructions. For example, the storage system 135 can be one or more flash drives and/or hard disk drives. Additionally, in accordance with aspects of the disclosure, the storage device 135 includes a partitioned logical volume 138 including a plurality of data partitions. In accordance with aspects of the disclosure, the partitioned logical volume 138 includes separate data partitions that correspond, respectively, to each of the devices 125. The data partitions can be individually activated/deactivated such that the information part 120 can only be stored a data partition that corresponds to its respective device. Thus, in accordance with aspects of the disclosure, the data partitions can be used to segregate the information part 120 as it changes stages (e.g., data in rest, data in use, and data in motion) during a transfer by the loader device 105.

The device selector 137 comprises a switch that connects an output of the loader device to a particular one of devices 25 of the remote system 115. In accordance with aspects of the disclosure, the device selector 137 provides physical contacts connecting an output of the storage device 135 to the devices 125, wherein the device selector 137 can only select a single one of the devices 125 at a time. More specifically, selections of the device selector 137 are mutually exclusive. In embodiments, the device selector 137 can be comprised of hardware, software or a combination thereof. In some embodiments, the device selector 137 is a purely hardware switch that receives the information part 120 from the partition logical volume 138 at a single input and, and provides the information part to a particular on of the devices 125 through one of a plurality of outputs. For example, the device selector 137 may be a dial having selections corresponding to each of the devices 125 in the remote system 115. Thus, the device selector 137 enables a user to select only one of the devices 125 to the exclusion of the non-selected devices via the dial. In other embodiments, the device selector 137 can be implemented in software via a graphic user interface (e.g., simulated dial, a drop-down menu, radio buttons, etc.) in which a user must select one of the devices 125 to the exclusion of the other selections.

In embodiments, the computing device 130 includes one or more processors 139, one or more memory devices 141 (e.g., RAM and ROM), one or more I/O interfaces 143, and one or more network interfaces 144. The memory device 141 can include a local memory (e.g., a random access memory and a cache memory) employed during execution of program instructions. Additionally, the computing device 130 includes at least one communication channel 146 (e.g., a data bus) by which it communicates with the I/O device 133, the storage system 135, and the device selector 137.

The processor 139 executes computer program instructions (e.g., an operating system), which can be stored in the memory device 141 and/or storage system 135. Moreover, in accordance with aspects of the disclosure, the processor 139 can execute computer program instructions of a selection control module 145 and a program selector module 147 to perform one or more of the processes described herein. The selection control module 145 and the program selector module 147 can be implemented as one or more sets of program instructions in the memory device 141 and/or the storage system 135 as separate or combined modules. Additionally, selection control module 145 and the program selector module 147 can be implemented as separate dedicated processors or a single or several processors to provide the function of these modules.

In accordance with embodiments of the disclosure, the selection control module 145 is computer program instructions stored in, for example, the memory device 141 and/or the storage system 135 that, when executed by the processor 139, causes the computing device 130 to request a particular information part 120 (e.g., avionics software) from the parts source 110 that corresponds to a selection a particular one of the devices 125 received from user (e.g., a maintenance technician) via the program selector module 147. Additionally, the selection control module 145 causes the computing device 130 to selectively activate a particular partition of a partitioned logical volume 138 in the storage system 135 that corresponds to the selected one of the devices 125 in the remote system 115, while selectively deactivating any data partition that does not correspond to the selected one of the devices 125. Further, the selection control module 145 causes the computing device 130 to store the information part 120 in the particular data partition. Moreover, the selection control module 145 causes the computing device 130 to transfer the information part 120 to the particular one of the devices 125 based on a selection of the device selector 137. Thus, as detailed herein below, selection control module 145 ensures that the information part 120 is retrieved from the parts source 110 and transferred to a correct one of the devices 125 in the remote system 115.

In accordance with embodiments of the disclosure, the program selector module 147 is computer program instructions stored in, for example, the memory device 141 and/or the storage system 135 that, when executed by the processor 139, causes the computing device 130 to perform operations that provide a computer-user interface by which a user can select a particular one of the devices 125 of the remote system that will receive the information part 120. In embodiments, the selector module 147 can provide a graphic user interface including selections corresponding to each of the devices 125 of the remote system 115. A user can, thereby, select one of the devices and the selector module 147 can communicate the selection to the selection control module 145. In an exemplary implementation in which the remote system 115 is an aircraft, the program selector module 147 can present a graphic user interface providing a menu of avionics devices in the aircraft control domain. A maintenance technician can select one of the avionics devices from the menu to receive a software update from the parts source 110 via the loader device 105.

It is noted that the computing device 130 can comprise any general purpose computing article of manufacture capable of executing computer program instructions installed thereon (e.g., a personal computer, server, etc.). However, the computing device 130 is only representative of various possible equivalent-computing devices that can perform the processes described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Figure 2:
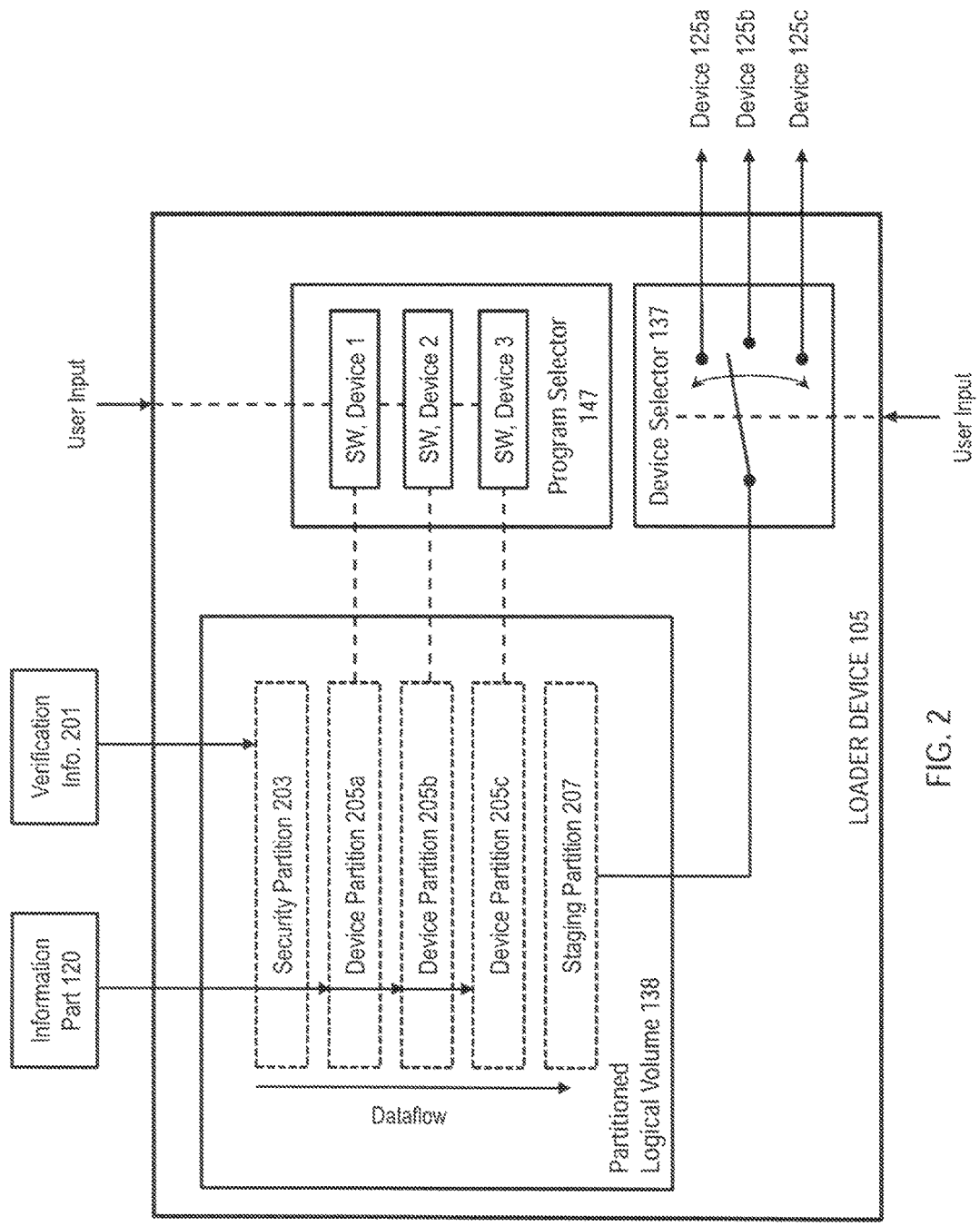
FIG. 2 illustrates a functional block diagram of an exemplary loader device in accordance with aspects of the disclosure.

FIG. 2 illustrates a functional block diagram of an exemplary loader device 105 in accordance with aspects of the disclosure. The loader device 105 includes device selector 137, program selector 147, and partitioned logical volume 138, which may be the same as those previously described. In accordance with aspects of the disclosure, the loader device 105 obtains information part 120 from a source (e.g., parts source 110) and loads the information part 120 into a corresponding one of devices 125a, 125b, 125c, which may be the same as the devices of the remote system previously described. In embodiments, the loader device 105 verifies that the information part 120 is authentic and uncorrupted using two-factor authentication. Additionally, the loader device can ensure that the information part 120 is loaded into a correct one of the devices 125a, 125b, and 125c using separate data partitions of the partitioned logical volume 138 that correspond to each of the devices 125a, 125b, 125c.

In accordance with aspects of the disclosure, a user inputs a request to load information parts into one of devices 125a, 125b, 125c by choosing a particular one of the devices 125a, 125b, 125c via an interface provided by the loader device 105 (e.g., using program selector module 147). After receiving a selection of one of the devices 125a, 125b, 125c from the user, the loader device 105 can establish a secure communication link (e.g., communication link 117a) to obtain the appropriate information part 120 that corresponds to the selection. The secure communication link can be, in implementations, a secure internet protocol link through which a virtual private network tunnel is established.

Additionally, in accordance with aspects of the invention, the loader device 105 obtains verification information 201 corresponding to the information part 120 via the secure information link In embodiments, the loader device 105 obtains the verification information 201 by a pulling it or fetching it from the source. The verification information 201 can include a known checksum value (e.g., SHA 256 checksum) and/or a known binary code comparison value. In embodiments, the verification information 201 can be obtained separately from the information part 120 to minimize risk of a man-in-the-middle attach intercepting both the verification 201 and the information part 120.

Further, in accordance with aspects of the disclosure, after receiving the selection of one of the devices 125a, 125b, 125c, the loader device 105 selectively activates/deactivates data partitions in the partitioned logical volume 138. In embodiments, the partitioned logical volume 138 can include the following data partitions: security partition 203, device partition 205a, device partition 205b, device partition 205c, and staging partition 207. The loader device 105 (e.g., via program selector module 147) can activate a particular one of device partitions 205a, 205b, 205c that has been mapped to the selected one of the devices 125a, 125b, 125c, and deactivates all of the other device partitions 205a, 205b, 205c that are not mapped to the selected one of the devices 125a, 125b, 125c. While FIG. 2 only shows three device partitions 205a, 205b, 205c, and three devices 125a, 125b, 125c, it understood that implementations of the disclosure are not limited to these numbers, and can include fewer or greater numbers of the device partitions and devices.

Further, prior to transferring the stored information part 120 to a selected device 125a, 125b, and 125c, the loader device 105 receives the information part 120 from the device partitions 205a, 205b, 205c and stores the information part in the staging partition 207. In accordance with aspects of the disclosure, the staging partition 207 can only be populated by a pull or fetch function (e.g., via selection control module 145). In the staging partition 207, the information part 120 is verified by matching it against the verification information 201, which can be stored in the security partition 203. As noted above, the verification information 201 can be a known checksum value (e.g., SHA 256 checksum) and/or a known binary code comparison value. Accordingly, the loader device 105 can verify the integrity of the information part 120 by determining a checksum and/or binary code comparison value for the information part 120 and comparing the determined checksum and/or binary code comparison value to the verification information 201. In embodiments, the loader device 105 must determine that both the checksum value and the binary code comparison value determined from the information part 120 are valid for the information part 120 to be considered correct and/or authentic. In embodiments, results of the verification in the staging partition 207 can be presented out-of-band and communicated back to responsible parties, providing a reporting and review capability. Thus, the loader device 105 provides an effective end-to-end checking capability that detects any issues related to the stage of processing during which the data at rest.

Moreover, in accordance with aspects of the disclosure, the loader device 105 must receive a correct selection of one of the devices 125a, 125b, 125c from a user via the device selector 137 prior to connecting and/or loading the information part 120 in any of the devices 125a, 125b, 125c. In implementations, the device selector 137 is a physical dial with discreet hardware selections that only allows the user to select an individual one of the devices 125a, 125b, 125c at a time. Additionally, in accordance with aspects of the disclosure, the loader device 105 can include logic that prevents loading of the information part 120 based on a determination that the selection of the device selector 137 does not match the selection received by the program selector 147. Thus, the loader device 105 ensures that the information part 120 is only loaded to the correct one of the devices 125a, 125b, 125c.

In an exemplary implementation, the devices 125a, 125b, 125c may correspond, respectively, to a FMC, an EIU, and an EMU of an aircraft. A maintenance technician of the aircraft can initiate a software update of the FMC via the program selector 147 by selecting the FMC in a GUI from among a list of avionics on the aircraft that includes the FMC, the EIU, and the EMU. Based on the selection, the loader device 105 can establish a secure internet protocol data link (e.g., communication link 117a) with a ground facility of an aircraft operator (e.g., parts source 110). Additionally, the loader device 105 can activate the device partition 205a, which has been mapped to the FMC in the loader device 105, and deactivate device partitions 205b and 205c, which have been mapped to the EIU and the EMU. Thus, in accordance with aspects of the disclosure, the loader device 105 prevents the information part 120 for the FMC from being placed into the device partitions 205b, 205c mapped to the EIU and EMU. To transfer the information part 120 to the FMC, the maintenance technician must also select the FMC via the device selector 137, which establishes a physical connection to a communication link (e.g., communication link 117b) between the loader device 105 and the FMC, while preventing any physical connection to the EIU and EMU. Further, prior to transferring the information part 120 to the FMC, the loader device 105 moves the software update for the FMC from the device partition 205 into the staging partition 207 and performs a two-factor authentication of the information part 120 using the verification information 201 corresponding to the information part 120. If the verification fails, then the loader device 105 can prevent the transfer to the information part 120 from the staging partition 207 to prevent the loading of corrupted information into the FMC. Alternatively, if the verification succeeds, and if the user has selected the correct device using the device selector 137, then the loader device 105 provides the software update to the FMC. Accordingly, the loader device 105 prevents the software update from being loaded into a wrong device.

Figure 3:
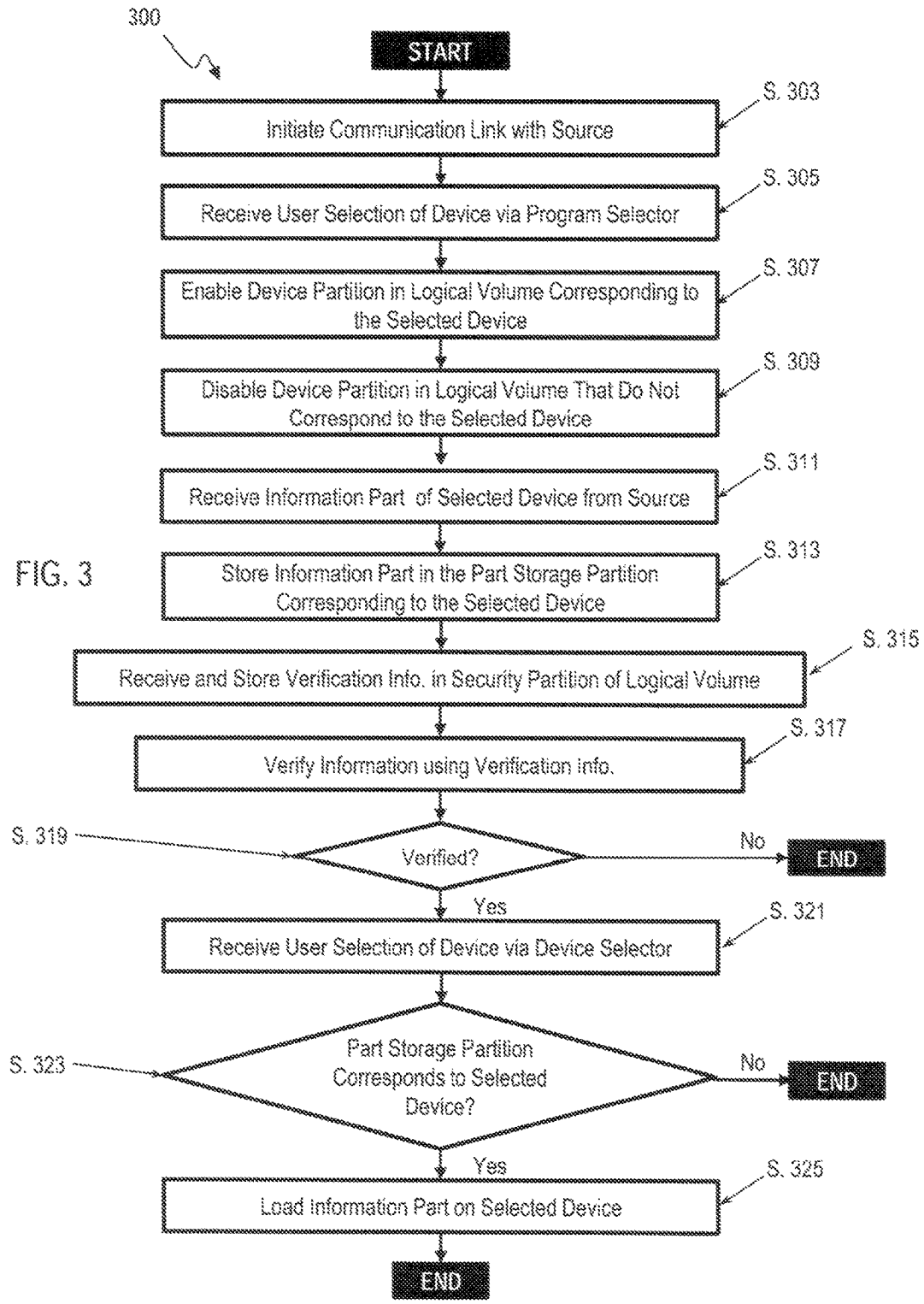
FIG. 3 illustrates a flow diagram of an exemplary process for transferring information using a loader device in accordance with aspects of the disclosure.

The flowchart in FIG. 3 illustrates functionality and operation of possible implementations of systems, devices, methods, and computer program products according to various embodiments of the present disclosure. Each block in the flow diagram of FIG. 3 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 3. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3 illustrates a flow diagram of an exemplary process 300 for transferring information parts in accordance with aspects of the disclosure. The steps of FIG. 3 can be implemented using the loader device (e.g., loader device 105) of FIGS. 1 and 2 to obtain an information part (e.g., information part 120) from a parts source (e.g., parts source 110) and to transfer the information part to a particular device (e.g., device 125a) of a remote system (e.g., remote system 115). At step 303, the loader device (e.g., executing selection control module 145) initiates a communication link (e.g., communication link 117a) with the parts source. In embodiments of the disclosure, the communication link can only be initiated from the loader device e.g., to prevent a man-in-the-middle attack.

At step 305, the loader device receives from a user a selection of one on a plurality of selections (e.g., via the program selector module 147) corresponding to devices (e.g., devices 125) of the remote system. In embodiments, the loader device presents selections to the user corresponding to each of the devices, such that the user must select a particular one of the devices. For example, the devices in an aircraft can include a FMC, an EIU, and an EMU. In such case, the loader device can present a GUI displaying selections identifying the FMC, the EIU, and the EMU, respectively, from which a maintenance technician can select only one at a time. In other words, the selections are mutually exclusive. For example, the selection of the FMC precludes the selection of the EIU and the EMU.

At step 307, the loader device enables (e.g., activates) a predetermined data partition (e.g., device partition 205a) of a partitioned logical volume (e.g., partitioned logical volume 138) corresponding to the device (e.g., device 125a) selected in step 305. And, at step 309, the loader device disables (e.g., deactivates) predetermined data partitions (e.g., device partitions 205b and 205c) corresponding to the devices (e.g., devices 125b and 125c) that the user did not select at step 305.

At step 311, the loader device receives the information part selected in step 305 via the communication link established by the loader device in step 303. At step 313, the loader device stores the information part received at step 311 in the data partition enabled in step 307. Thus, in accordance with aspects of the present disclosure, the information part can be received via a secure communication link established by the loader device, and can only be stored in a particular one of the data partitions corresponding to the device selected by the user.

At step 315, the loader device stores received verification information (e.g., verification information 201) of the received information part in a security partition of the partitioned logical volume. In accordance with aspects of the invention, the loader device pulls or fetches the verification information from the source at a separate time and/or using a separate communication link from the information part.

At step 317, the loader device verifies the information part stored at step 313 using the verification information stored at step 315. In accordance with aspects of the disclosure, the verification comprises a two-factor authentication. In embodiments, the verification comprises comparing a checksum and a bit count of the information part stored in the security partition with corresponding values received by the loader device from the creator or provider of the information part.

At step 319, the loader device determines whether the verification of the information part at step 317 was successful. If not, then the process 300 ends. In embodiments, when the process 300 ends at this step, the loader device generates warning and/or report, which can be used to track the source of the verification failure. If the loader device determines that the verification was successful at step 319, then at step 321 the loader device determines which of the devices was selected by the user via the device selector (e.g., device selector 137).

At step 323, the loader device determines whether data partition storing the information part stored in step 313 corresponds to the setting of the device selector at step 321. In embodiments, the loader device determines whether an identifier of the part partition matches an identifier of the setting of the device selector. If not (e.g., step 323 is "No"), then the process 300 ends. For example, if the device partition corresponds to a FMC, but the selection of the device selector corresponds to an EIU, then the loader device prevents the transfer. If the loader device determines the part partition having the information part stored in step 313 corresponds to the setting of the device selector at step 321 (e.g., step 323, "Yes"), then the loader device loads the information part from the stored in step 313. For example, if the device partition corresponds to the FMC, and the selection of the device selector corresponds to the FMC, then the loader device transfers the information part to the FMC, which ends the process 300. The process 300 can be restarted to load the same or other devices.

As illustrated in FIG. 3 and detailed above, the process 300 provides secure and robust transfer of the information part by the loader device to a particular device of remote system by storing the information part in a particular data partition that corresponds to the device. Further, using the device selector, the process prevents the transfer of the information part to any device different from that which corresponds to the data partition. Moreover, the process can use two-factor authentication to verify that the information part is authentic and uncorrupted.

Figure 4:
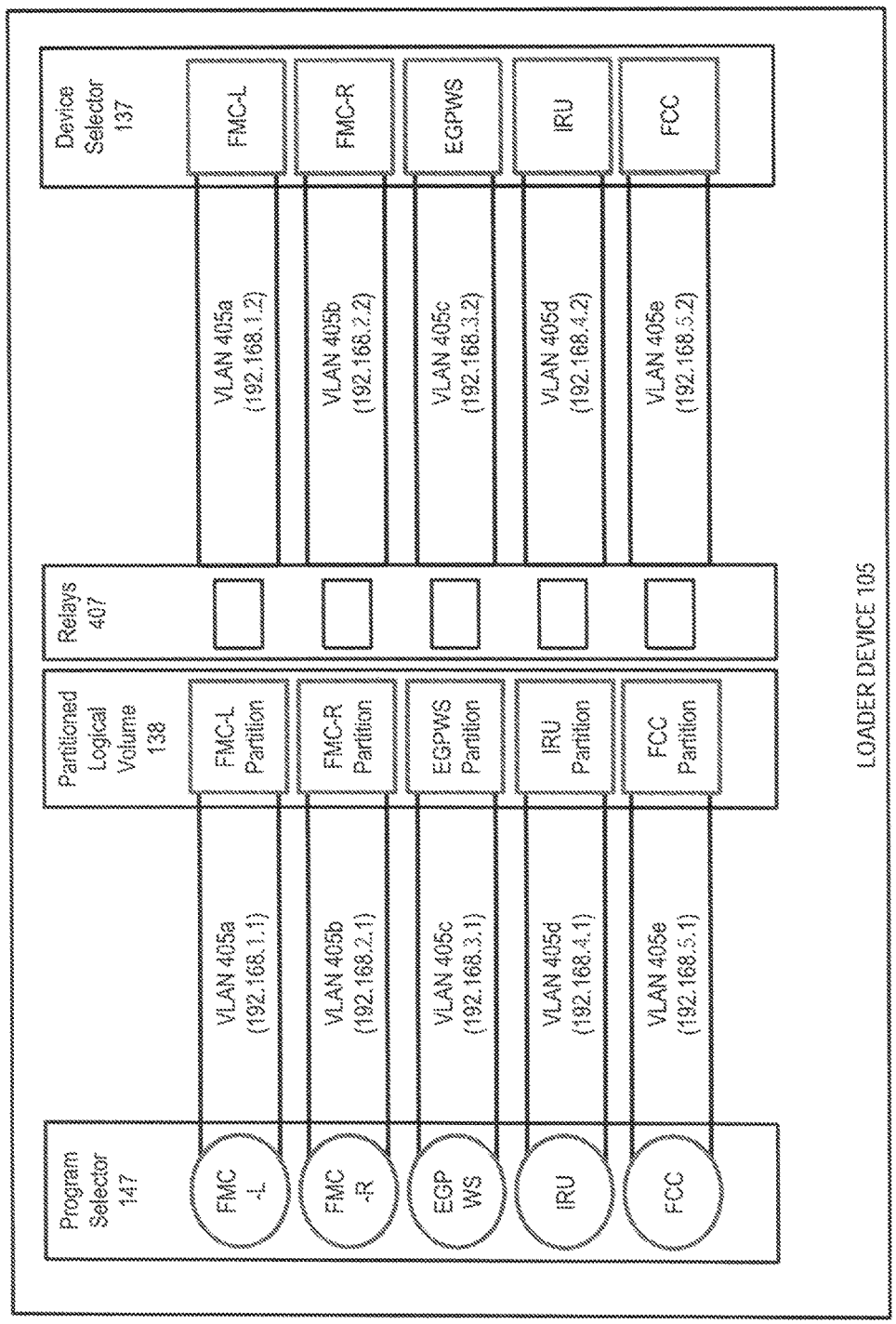
FIGS. 4-6 illustrate functional flow diagrams for transferring information using an exemplary loader device in accordance with aspects of the disclosure.
Figure 5:
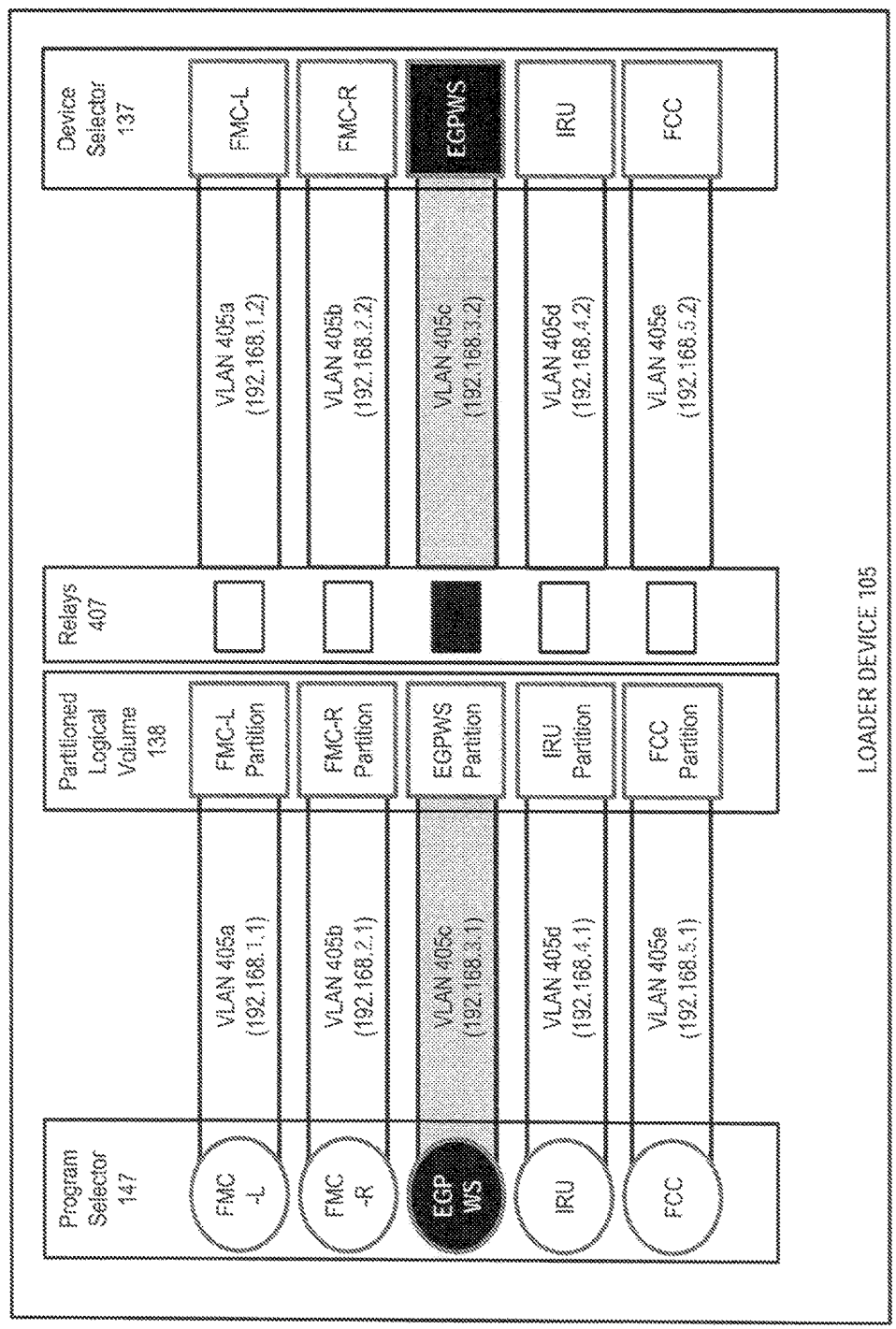
Figure 6:
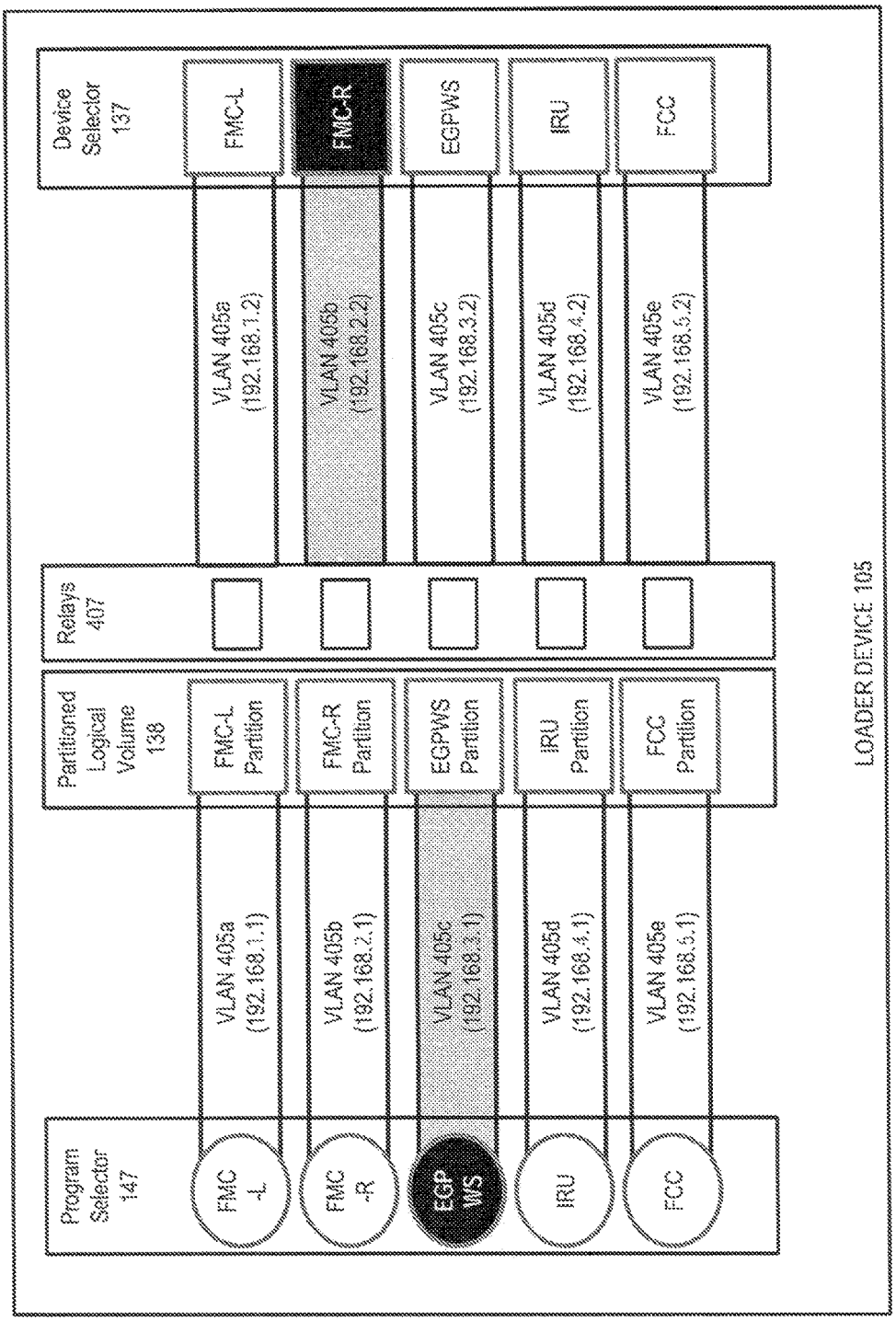

FIGS. 4-6 illustrate functional flow diagrams for transferring an information part using the loader device 105, which may be the same or similarly that that previously described. The loader device 105 includes program selector 147, partitioned logical volume 138, and device selector 137, which can be the same as those previously described. As also previously described, the partitioned logical volume 138 includes a plurality of device partitions (e.g., device partitions 205a, 205b, and 205c) corresponding, respectively, to devices (e.g., devices 125a, 125b, 125c) of a remote system (e.g., remote system 115). Further, as described previously, the program selector 147 presents a plurality of individual selections corresponding, respectively, to the devices, and which can be selected by a user via the loader device 105.

As illustrated in, for example, FIG. 4, the loader device 105 provides a one-to-one mapping of selections of the program selector 147, the device partitions of the partitioned logical volume 138, and the device selections of the device selector 137. In accordance with some implementations of the present disclosure, each respective mapping of a selection of the program selector 147, device partition of the partitioned logical volume 138, and selection of the device selector are communicatively linked by a respective virtual local area networks (VLAN) 405a . . . 405e. In embodiments, each VLAN can have a unique internet protocol address (e.g., 192.168.1.1, 192.168.2.1, 192.168.2.1, 192.168.3.1, 192.168.4.1, and 192.168.5.1), As shown in the exemplary implementation illustrated in FIG. 4, the program selector 147 provides the following selections FMC-L, FMC-R, EGPWS, IRU, and FCC, which have corresponding device partitions in the partitioned logical volume 138, and corresponding selections of the device selector 137. For example, VLAN 405a can communicate information indicating whether a user selected the FMC-L selection of the program selector 147 to the corresponding FMC-L partition of the partitioned logical volume 138. Further, the VLAN 405a can communicate information stored in the FMC-L partition to the FMC-L output of the device selector 137. In accordance with aspects of the disclosure, relays 407 can individually connect/disconnect each of the VLANs 405a . . . 405e depending on the state of the program selector 147 and the device selector 137. More specifically, implementations of the disclosure require that a user select both the selection of the program selector 147 (e.g., FMC-L) and the respective selection of the device selector 137 (e.g., FMC-L) to transfer an information part (e.g., information part 120) to the corresponding FMC-L device. Accordingly, the relays 407 can physically disconnect each of the VLANs 405a . . . 405e based on their respective selections input to program selector 147 and the device selector 137. As illustrated in FIG. 4, for example, the relays 407 have disconnected all of the VLANs 405a . . . 405e and, thereby, prevent transfer of any information from the loader device 105.

FIG. 5 illustrates the loader device 105 in an exemplary state in which the EGPWS selection of the program selector 147 matches the EGPWS selection of the device selector 137. Thus, in accordance with aspects of the disclosure, the corresponding VLAN 405c is connected by the respective one of the relays 407, whereas the respective relays 407 of VLANs 405a, 405b, 405d, and 405e corresponding to the other selections disconnect these networks. Thus, the selection device 105 permits the transfer of the information part from the EGPWS partition to the EGPWS device.

FIG. 6 illustrates the loader device 105 in an exemplary state in which the EGPWS selection of the program selector 147 does not match the EGPWS selection of the device selector 137. Rather, the FMC-R selection of the device selector is selected. Thus, in accordance with aspects of the disclosure, the relays 407 disconnect all of the VLANs 405a . . . 405e, which prevents an information part stored in the EGPWS partition from being transferred to an incorrect device. That is, the loader device 105 prevents an information part stored in the EGPWS partition from being transferred to the FMC-R device.

Figure 7:
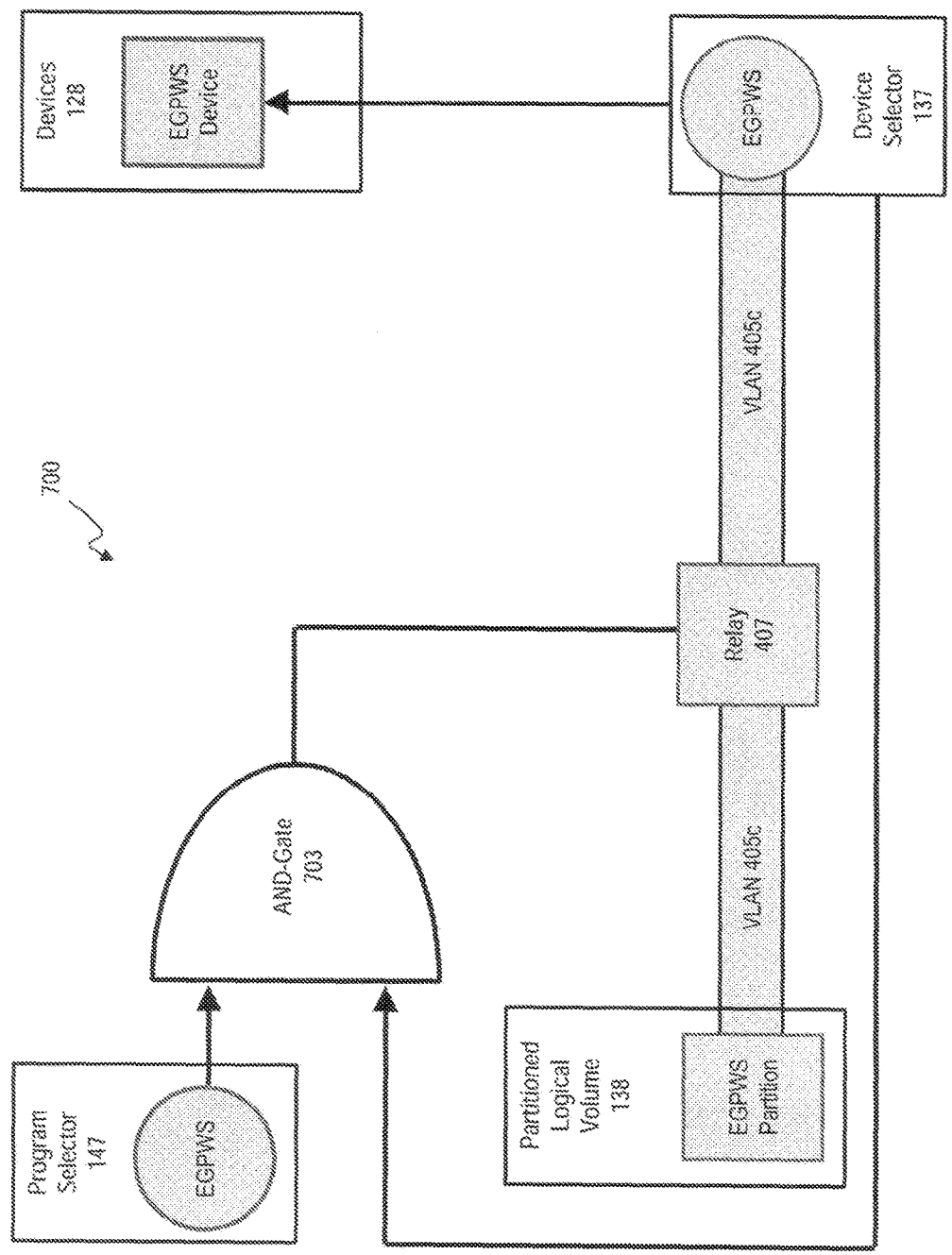
FIG. 7 illustrates a block diagram of exemplary logic for a relay in accordance with aspects of the disclosure.

FIG. 7 illustrates a block diagram of exemplary logic 700 for a relay in accordance with aspects of the disclosure. FIG. 7 shows devices 128, device logic 137, partitioned logical volume 138, program selector 147, VLAN 405, and a corresponding one of the relays 407, which may be the same or similar to those previously described. Additionally, the logic 700 includes an AND-gate 703 that outputs logic signal to controlling the activation of the relays 407 based on the selections output from the device selector 137 and the program selector 147. More specifically, the device selector 137 and the program selector 147 can output logic signals indicating whether a user has selected a particular selection corresponding to one of the devices 128 (e.g., EGPWS). If both the logic signals output by the device selector 137 and the program selector 147 have a state (e.g., digital logic HI) indicating selection of a same device (e.g., EGPWS), then the AND-gate 703 outputs a logic signal that causes the corresponding one of the relays 407 to close. This enables an information part (e.g., information part 120) stored in the corresponding device partition (e.g., EGPWS partition) to be transferred via VLAN via the device selector 137, and to a corresponding one of devices 128 (e.g., EGPWS device). While FIG. 7 only shows logic 700 for single instance, it is understood that the logic 700 can be repeated for a number of such instances included in a loader device 105.

FIG. 8 illustrates an exemplary aircraft 800 including a loader device 105 in accordance with aspects of the disclosure. The aircraft can be the same or similar to the remote system (e.g., remote system 115) previously described. Additionally, the loader device 105 may be the same as that previously described. The aircraft 800 can include an aircraft control domain ("ACD") 805, comprised of line-replaceable avionics units (e.g., a FCC, a FMC, an EIU, an EMU, an IRU, a GPWS, etc.). In embodiments, the loader device may be integrated into the aircraft 800 via a fixed communication link (e.g., communication link 117b). By doing so, the loader device 105 can eliminate laptops that are used in current maintenance systems. It is understood, however, that embodiments of the loader device 105 can be portable systems that are not permanently linked to the aircraft 800 or the ACD 805.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    receiving, via a first switch, a first selection from a first plurality of selections corresponding, respectively, to a plurality of devices;
    activating, based on the first selection, a data partition of a plurality of data partitions in a storage device corresponding to a first device of the plurality of devices that corresponds to the first selection, each of the plurality of data partitions corresponding to a respective one of the plurality of devices, wherein the first device is a line replaceable unit;

deactivating, based on the first selection, data partitions in the storage device corresponding to non-selected devices of the plurality of devices;

after the activating and the deactivating, storing information in the data partition corresponding to the first device, the information comprising a software package;

receiving, via a second switch, a second selection from a second plurality of selections corresponding to the plurality of devices;

determining that the first selection matches the second selection;

retrieving, based on the determining, the information from said activated data partition; and providing the retrieved information to the first device of the plurality of devices that corresponds to the first selection and the second selection in response to the information stored in the activated data partition being verified as authentic.

2. The method of claim 1, wherein the retrieving comprises placing retrieved information into a staging partition.

3. The method of claim 2, further comprising verifying the information in the staging partition.

4. The method of claim 1, wherein the receiving the first selection comprises presenting a computer-user interface including the first plurality of selections.

5. The method of claim 1, wherein the second switch is a hardware switch.

6. The method of claim 5, wherein said second switch provides physical contacts connecting an output of the storage device to the first device.

7. The method of claim 1, further comprising initiating a secure communication link with a source of the information.

8. A loader device comprising:
a storage device including a plurality of data partitions, each of the plurality of data partitions corresponding to a respective one of a plurality of devices;
a program selector including a first plurality of selections corresponding, respectively, to the plurality of devices;
a device selector including a second plurality of selections corresponding, respectively, to the plurality of devices; and
logic that provides an information part from a first of the plurality of data partitions corresponding to a respective first device of the plurality of devices when a first selection received from the program selector matches a second selection received from the device selector and the information part stored in the first data partition is verified as authentic, wherein the first device is a line replaceable unit and wherein the information part comprises a software package.

9. The loader device of claim 8, wherein the storage device further includes a staging partition that authenticates the information part before the logic provides the information part to the first device.

10. The loader device of claim 8, wherein the program selector presents the first plurality of selections using a graphic user interface and each of the first plurality of selections is mutually exclusive.

11. The loader device of claim 8, wherein the device selector is a hardware switch and each of the second plurality of selections is mutually exclusive.

12. The loader device of claim 11, wherein the device selector includes contacts that physically connect an output of the storage device to the first device.

13. The loader device of claim 8, further comprising an input/output device that initiates a secure communication link with a parts source and receives the information part from the part source.

14. A system comprising:
a processor;
a storage system comprising a logical volume including a plurality of data partitions;
a computer-readable hardware storage device;
program instructions stored on the computer-readable hardware storage device for execution by the processor, the program instructions comprising:
program instructions that receive from a first switch a first selection of a first device from a first plurality of selections, wherein the first plurality of selections correspond respectively to a plurality of devices, and wherein the first device is a line replaceable unit;
program instructions that activate a first data partition of the plurality of data partitions that corresponds to the first device, each of the plurality of data partitions corresponding to a respective one of the plurality of devices;
program instructions that deactivate data partitions of the plurality of data partitions that correspond to non-selected devices of the plurality of devices;
program instructions that store information corresponding to the first device in the first data partition, the information comprising a software package;
program instructions that determine whether the first selection matches a second selection received from via a second switch;
program instructions that retrieve the information from the first data partition based on the determination that the first selection matches the second selection; and
program instructions that provide the information to the first device in response to the information stored in the first data partition being verified as authentic.

15. The system of claim 14, wherein the program instructions that retrieve the information pull the information into a staging partition of the storage device.

16. The system of claim 14, further comprising program instructions that verify the integrity of the information in the staging partition.

17. The system of claim 14, wherein the second switch is a hardware switch that provides physical contacts connecting an output of the storage device to the first device.

18. The system of claim 14, further comprising program instructions that initiate a secure communication link with a source of the information.

19. The system of claim 14, further comprising logic that closes a relay connecting an output of the storage device to the first device only when the first selection matches the second selection.

* * * * *